Patented May 30, 1933

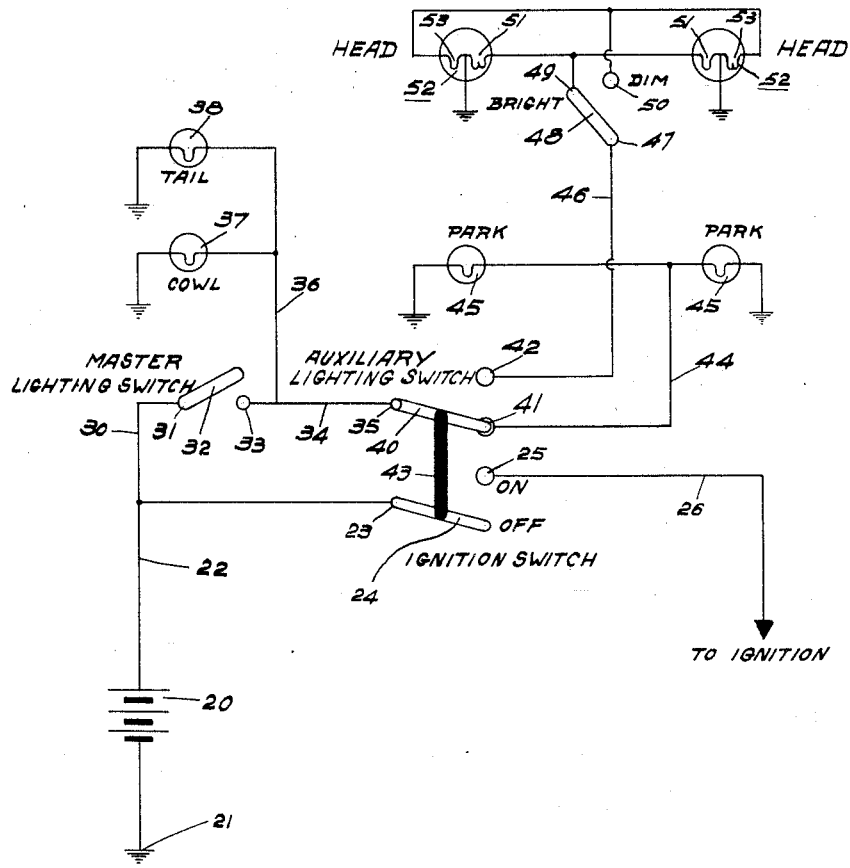

1,911,971

UNITED STATES PATENT OFFICE

WALTER W. RIEDEL, OF DAYTON, OHIO, ASSIGNOR TO DELCO-REMY CORPORATION, OF ANDERSON, INDIANA, A CORPORATION OF DELAWARE

AUTOMOBILE LIGHTING SYSTEM

Application filed May 28, 1931. Serial No. 540,652.

This invention relates to electric lighting systems for automotive vehicles and includes among its objects the provision of means for automatically turning off the head lamps whenever the ignition switch is moved into the position to render the ignition inoperative likewise turning on the head lamps and turning off the parking lamps when the ignition is turned on for vehicle operation.

This aim and object of the present invention is accomplished by coordinating with the ignition switch an auxiliary lighting switch by means of which the parking lamp circuit is connected with the storage battery when the ignition switch is moved to off position. When the ignition switch is moved to on position the auxiliary lighting switch will be moved so as to disconnect the parking lamp circuit from the battery and to connect the head lamp circuit with the battery. In order that the driving and parking lamps circuits will not be in use when not needed, there is provided a master lighting switch which controls also other necessary lighting circuits, such as the cowl lamp circuit and the tail lamp circuit.

Further objects and advantages of the present invention will be apparent from the following description, reference being had to the accompanying drawing wherein a preferred embodiment of one form of the present invention is clearly shown.

In the drawing:

The figure of the drawing is a wiring diagram illustrating a preferred embodiment of the present invention.

Referring to the wiring diagram, a storage battery 20 which is grounded at 21 is connected by a wire 22 with a terminal 23 of an ignition switch which comprises a movable contact 24 movable from an off position shown in the drawing to an on position in which it engages a contact 25 connected by a wire 26 with the ignition apparatus, not shown. The wire 22 is connected also by a wire 30 with a terminal 31 of a master lighting switch having a movable contact 32 movable into engagement with a contact 33 which is connected by wire 34 with the terminal 35 of an auxiliary lighting switch, and which is connected by wire 36 with a cowl lamp 37 and with a tail lamp 38.

The auxiliary lighting switch comprises a contact 40 movable into engagement either with a contact 41 or with a contact 42. A bar 43 mechanically but not electrically connects the contacts 24 and 40. It will be understood that when the contact 24 is in off position the contact 40 will engage the contact 41; and that when the contact 24 is in on position in engagement with the contact 25, the contact 40 will engage the contact 42. The contact 41 is connected by a wire 44 with a parking light circuit having a parking lamp 45. The contact 42 is connected by wire 46 with a terminal 47 of a dimmer switch having a contact 48 engageable either with contacts 49 or 50. When the contact 48 is in bright position, it engages contact 49 in order to connect the bright filaments 51 of the head lamps 52 with a source of current. When the dimmer contact 48 is in dim position it moves the contact 50 in order to connect the dim filaments 53 of the head lamp 52 with a source of current.

It is therefore apparent from the foregoing description of the wiring diagram that whenever the ignition switch is in off position the auxiliary lighting switch 40 is automatically moved into engagement with the contact 41 thereby causing the parking lamps 45 to burn provided the master lighting switch has been closed. When the ignition is turned on, the auxiliary switch contact 40 is automatically separated from the contact 41 and is moved into engagement with the contact 42 thereby causing the parking lamp circuit to be disconnected from the battery and the head lamp circuit to be connected therewith. Thus by the simple act of turning on the ignition the operator turns on the proper lights for running and consequently, by simply turning off the ignition the operator automatically turns on the proper lights for parking.

Obviously it is necessary that the operator attend to turning on the master lighting switch after dark. The operator will know that the master lighting switch has been turned on simply by observing the cowl or instrument board lamp 37 or the tail lamp 38.

While the form of embodiment of the present invention as herein disclosed, constitutes a preferred form, it is to be understood that other forms might be adopted, all coming within the scope of the claims which follow.

What is claimed is as follows:

1. A lighting system for a vehicle comprising, a source of current; two sets of head lamps, one of which is large and the other comparatively small; an ignition device for the vehicle; a master switch in circuit with the source of current; and a mechanically connected pair of switches adapted to be operated into one position to connect the ignition device with the source of current and the large head lamps with the master switch and into another position to disconnect the ignition device from the source of current and to connect the smaller head lamps with the master switch.

2. A lighting system for a vehicle comprising, a source of current; two sets of head lamps, one of which is large and the other comparatively small; an ignition device for the vehicle; two switches, one adapted to control the circuit between the ignition device and source of current, the other to control the circuit between the head lamps and the source of current; means mechanically connecting the two switches so that one will connect the large head lamps to and disconnect the smaller head lamps from the source of current while the other switch connects the ignition device to the source of current; and a master switch for controlling the circuit between the source of current and the head lamp switch.

3. A control system for the ignition and the lighting circuit for motor vehicles comprising in combination; a current source; a lamp circuit including head lamps, side lamps and a tail lamp; an ignition circuit; a pair of circuit controllers operable in unison and arranged in parallel with respect to each other to connect the lamp circuit and ignition circuits with the current source, said controllers adapted to be moved into position so that one will connect the side lamp while the other controller will disconnect the ignition circuit, and said controllers adapted to be moved into another position to connect the head lamp circuit and the ignition circuit; and a master switch in circuit with the current source for controlling all of the circuits.

4. A control system for the ignition and the lighting circuits for motor vehicles comprising in combination; a current source; an ignition circuit; a side lamp circuit; a head lamp circuit; a tail lamp circuit common to both the side and head lamp circuits; a mechanically connected pair of switches arranged in parallel with respect to each other to control the ignition circuit and to selectively connect the head or side lamp circuits with the current source, said switches adapted to be moved into one position connecting only the side lamp circuit and into another position connecting the ignition and the head lamp circuits; and a master switch in circuit with the current source for controlling all of the lamp circuits.

5. A control system for the ignition system and lighting circuits of a vehicle comprising in combination, a source of current; a head lamp circuit; a side lamp circuit; a tail lamp circuit; a master switch in circuit with the source of current for controlling all the lamp circuits; an auxiliary switch electrically connected with the master switch; an ignition switch in circuit with the current source, said switch being mechanically connected with the auxiliary switch, said ignition and auxiliary switch adapted concurrently to move into one position to close the ignition circuit and connect the head lamps in a circuit, and into another position to open the ignition circuit and disconnect the head lamps and connect the side lamps in a circuit.

In testimony whereof I hereto affix my signature.

WALTER W. RIEDEL.